(12) United States Patent
Chou et al.

(10) Patent No.: US 7,987,313 B2
(45) Date of Patent: Jul. 26, 2011

(54) CIRCUIT OF ON-CHIP NETWORK HAVING FOUR-NODE RING SWITCH STRUCTURE

(75) Inventors: Shu-Hsuan Chou, Chia-Yi (TW); Ming-Ku Chang, Chia-Yi (TW); Yi-Chao Chan, Chia-Yi (TW); Tien-Fu Chen, Chia-Yi (TW)

(73) Assignee: National Chung Cheng University, Chia-Yi (TW)

( * ) Notice: Subject to any disclaimer, the term of this patent is extended or adjusted under 35 U.S.C. 154(b) by 0 days.

(21) Appl. No.: 12/068,752

(22) Filed: Feb. 11, 2008

(65) Prior Publication Data
US 2010/0287326 A1    Nov. 11, 2010

(51) Int. Cl.
*G06F 13/00* (2006.01)
*H04L 12/28* (2006.01)
*G08C 15/00* (2006.01)
*H04J 1/14* (2006.01)

(52) U.S. Cl. ........ 710/316; 370/221; 370/222; 370/223; 370/224; 370/258

(58) Field of Classification Search ............... 710/316; 370/221–224, 258
See application file for complete search history.

(56) References Cited

U.S. PATENT DOCUMENTS

| | | | | |
|---|---|---|---|---|
| 4,835,763 | A * | 5/1989 | Lau | 370/223 |
| 5,491,686 | A * | 2/1996 | Sato | 370/223 |
| 6,041,036 | A * | 3/2000 | Baek et al. | 370/222 |
| 6,526,020 | B1 * | 2/2003 | Ando | 370/223 |
| 7,031,608 | B2 * | 4/2006 | Chiaroni et al. | 398/79 |
| 7,782,762 | B2 * | 8/2010 | Xu | 370/218 |

* cited by examiner

*Primary Examiner* — Mark Rinehart
*Assistant Examiner* — Jeremy S Cerullo
(74) *Attorney, Agent, or Firm* — Jackson IPG PLLC; Demian K. Jackson

(57) ABSTRACT

A hierarchical ring architecture is constructed with on-chip networks. The on-chip network includes two type-0 ring nodes and two type-1 ring nodes. Multiple data transfer is provided in parallel between multiple processor cores or multiple functional units and register banks with a dynamic configuration. A low control complexity, an optimized local bandwidth, an optimized remote node path, a low routing complexity, and a simplified circuit is thus obtained.

4 Claims, 25 Drawing Sheets

CIRCUIT OF ON-CHIP NETWORK HAVING FOUR-NODE RING SWITCH STRUCTURE

FIELD OF THE INVENTION

The present invention relates to an on-chip network; more particularly, relates to providing an optimized system-on-chip (SOC) design integrating multiple processor cores and IPs.

DESCRIPTION OF THE RELATED ART(S)

Communications between components of a multi-core processor or of a single core processor with multiple functional units are important. Yet, a traditional single channel bus is not enough for supporting high bandwidth and high efficiency multi-components communications. Thus, some other type of bus, like a crossbar bus, a multi-layer bus or a multi-node ring bus, enhances bandwidth and efficiency. However, path collision, control complexity, area overhead and power consumption are not easily optimized. In this application, Applicants target on improving ring-based on-chip networks. With respect to ring-based interconnect design, increasing the ring node number will heighten design complexity and complicate arbitration, buffer usage, path optimization. Especially in arbitration, the complexity of the arbiter will increase exponentially by increasing the number of ring nodes. More ring nodes sharing one ring path will limit bandwidth and increase traffic. However, multiple ring nodes sharing multiple ring paths is not an easy design to implement.

In order to solve this problem, the subject application takes a design policy of providing a simple/efficient ring structure and a hierarchical construction. It proposes a four-node ring switch structure with hierarchical rings to construct ring-based interconnects.

SUMMARY OF THE INVENTION

The main purpose of the present invention is to provide multiple data transfer paths in parallel with a dynamic configuration between multiple processor cores or multiple functional units and registers for obtaining a low control complexity, an optimized local bandwidth, an optimized remote node path, a low routing complexity, and a simplified circuit.

To achieve the above purposes, the present invention is a circuit of an on-chip network having a four-node ring switch structure, comprising two type-0 ring nodes and two type-1 ring nodes for dual-directional data transfer, where the type-0 ring nodes comprises three data input ports, three data output ports and five data transferring lines (as shown in FIG. 1B). The type-0 ring node transfers and switches data. Two pairs of the data input ports and the data output ports of the type-0 ring node are left side connection and right side connection data transfers. The other pair of the data input port and the data output port of the type-0 ring node are input interface and output interface data transfers. The type-1 ring node comprises four data input ports, four data output ports and nine data transferring lines (as shown in FIG. 2B). The type-1 ring node transfers and switches data. Two pairs of the data input ports and the data output ports of the type-1 node are left side connection and right side connection data transfers. Another pair of the data input port and the data output port of the type-1 ring node are cross connection data transfers in the four-node ring switch structure and the other pair of the data input port and the data output port of the type-1 ring node are input interface and output interface data transfers. Accordingly, a novel circuit of an on-chip network having a four-node ring switch structure is obtained.

The proposed four-node ring switch structure with bi-directional ring paths (one is clockwise, another is counter-clockwise) supports efficient parallel data access while providing maximum local communication bandwidth. The proposed four-node ring switch structure contains a simple arbiter, high bandwidth, and easy replication and linking properties. The hierarchical construction four nodes ring structures provides a low-cost, flexible and large scalar design solution. Distributed arbiters are provided and the complexity is not increased greatly by ring nodes. Overall, the subject application provides efficient parallel data access, and a low-cost and flexible solution in multi-components communications.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Please refer to FIG. 1A, FIG. 1B, FIG. 2A and FIG. 2B, which are views showing a type-0 ring node and a type-1 ring node for dual-directional data transfer according to a preferred embodiment of the present invention. As shown in the figures, the present invention is a circuit of an on-chip network having a four-node ring switch structure comprising two type-0 ring nodes 11 and two type-1 ring nodes 12 for dual-directional data transfer.

Figure 1A:
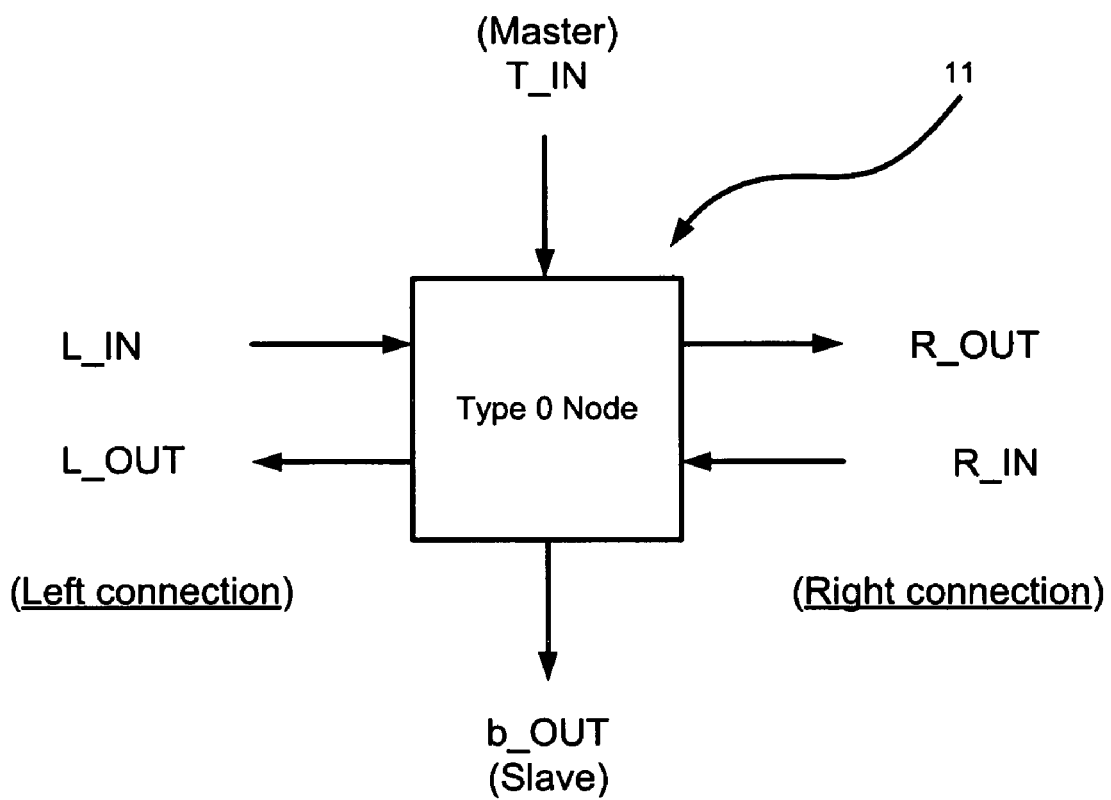
FIG. 1A and FIG. 1B are views showing a type-0 ring node for dual-directional data transfer according to the preferred embodiment of the present invention.
Figure 1B:
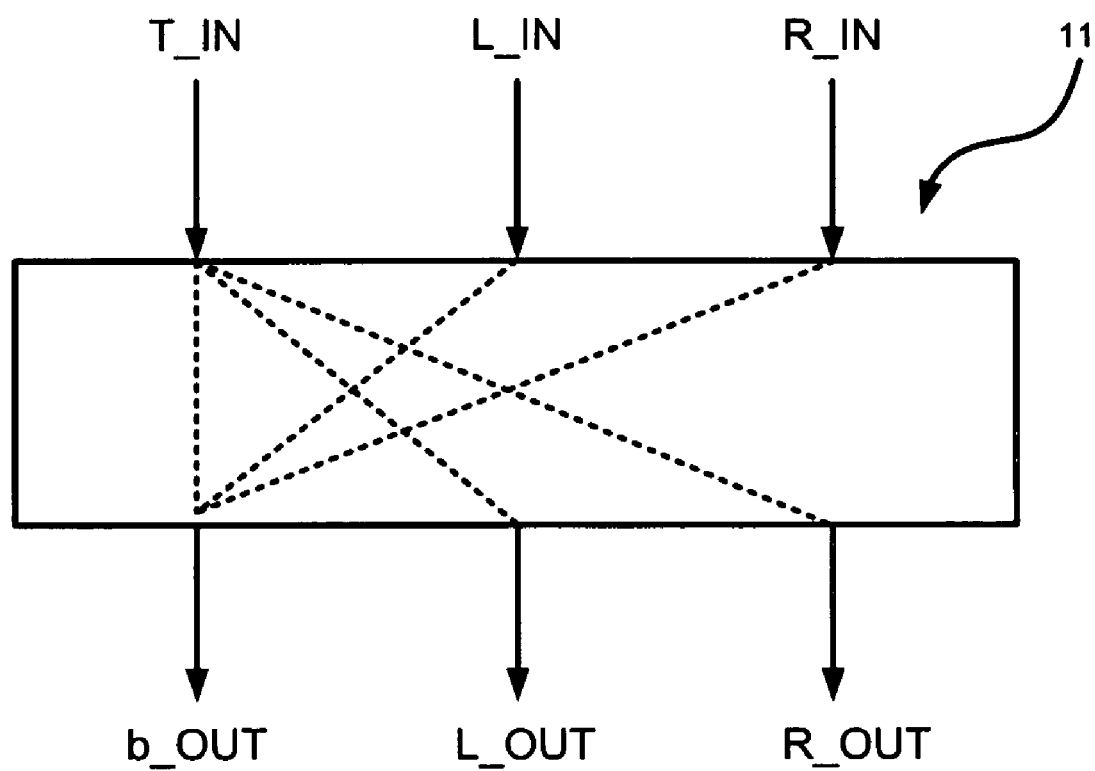

The type-0 ring node 11, as shown in FIG. 1A, comprises three data input ports and three data output ports for transferring and switching data and five data transferring lines (as shown in FIG. 1B), where two pairs of the data input ports and the data output ports are left side connection and right side connection data transfers respectively and the other pair of the data input port and the data output port are input interface and output interface data transfers respectively. The type-0 ring node 11 has a cut path to prevent an infinite loop. As the present invention does not need lines for left-in-left-out and right-in-right-out data transference, an original nine (3×3) data transferring lines, otherwise required, are reduced to five data transferring lines.

Figure 2A:
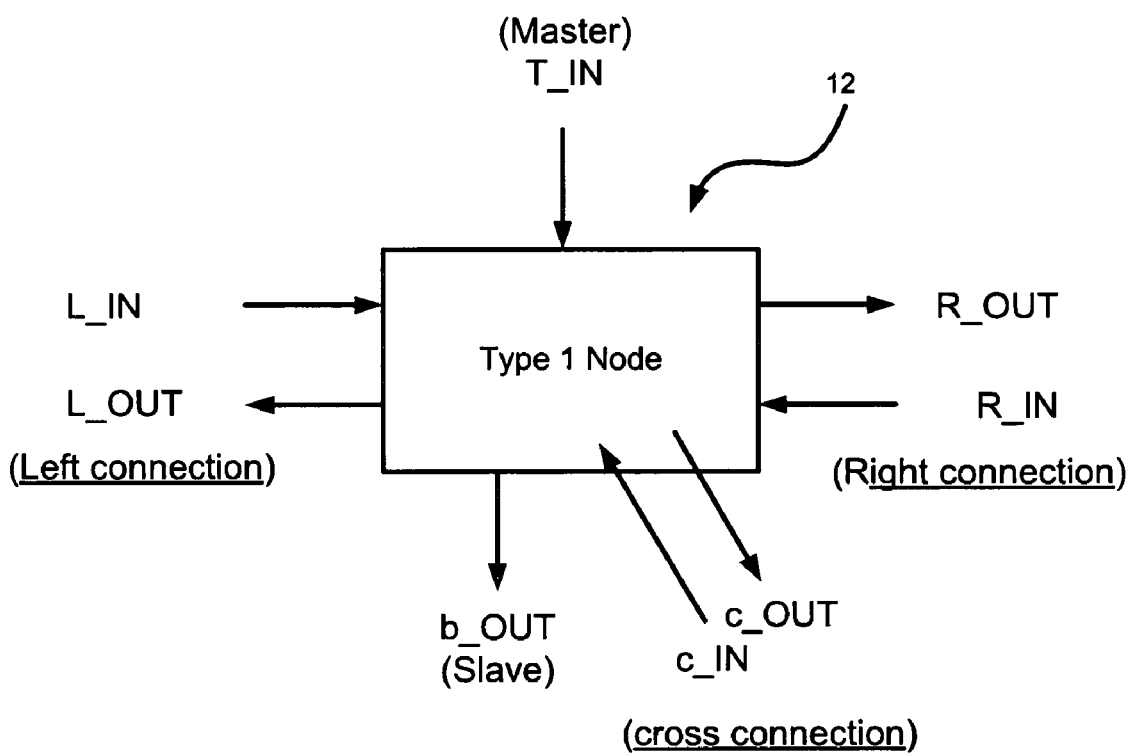
FIG. 2A and FIG. 2B are views showing a type-1 ring node for dual-directional data transfer.
Figure 2B:
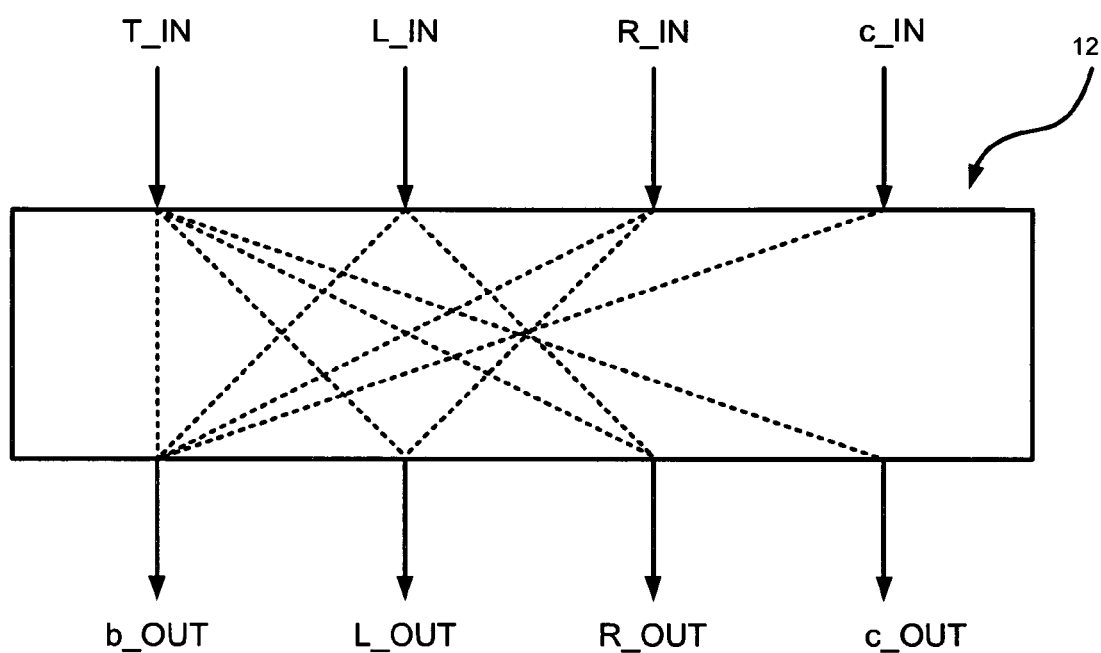

The type-1 ring node 12, as shown in FIG. 2A, comprises four data input ports and four data output ports for transferring and switching data and nine data transferring lines (as shown in FIG. 2B). Two pairs of the data input ports and the data output ports are left side connection and right side connection data transfers respectively. Another pair of the data input port and the data output port are cross connection data transfers and the other pair of the data input port and the data output port are input interface and output interface data transfers. The type-1 ring node 12 has a cross path to reach a destination which is not reachable by the cut path. Thus, the type-1 ring node 12 support lines for left-in-right-out and right-in-left-out data transference by connecting cross input ports and data output ports and by connecting cross output ports and data input ports. As the present invention does not need lines for left-in-left-out and right-in-right-out data transference, an original sixteen (4×4) data transferring lines required are reduced to only nine data transferring lines.

Figure 3A:
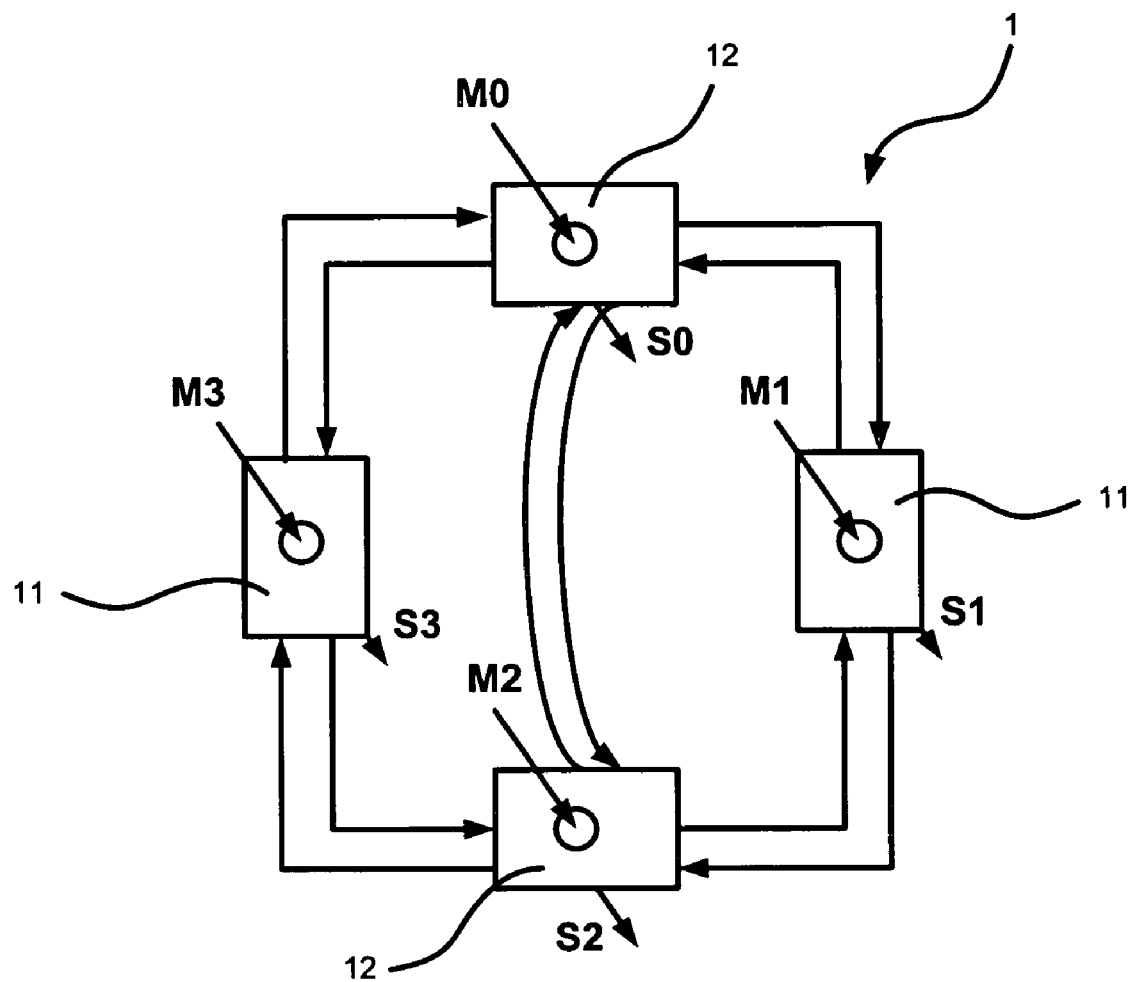
FIG. 3A and FIG. 3B are views showing the preferred embodiment.
Figure 3B:
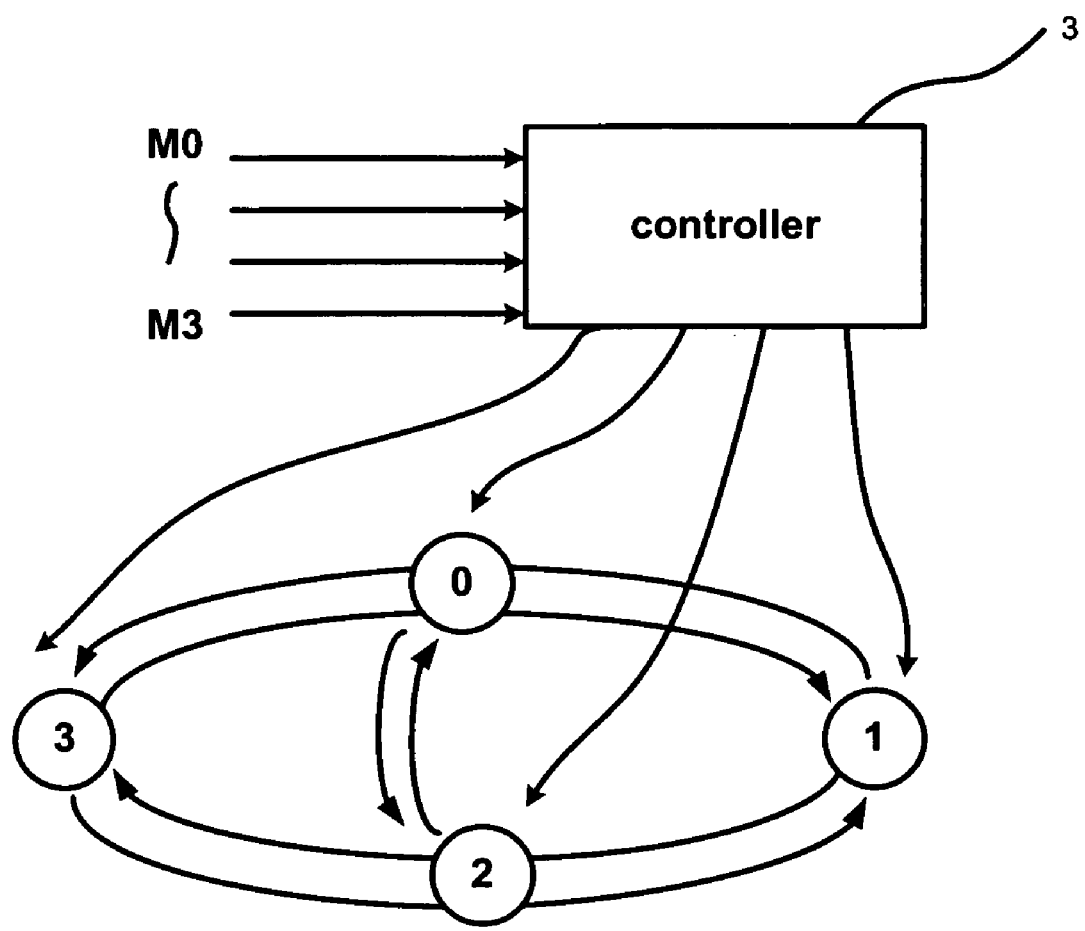

Please refer to FIG. 3A and FIG. 3B, which are views showing a preferred embodiment. As shown in the figures, the present invention comprises two type-0 ring nodes 11 and two type-1 ring nodes 12 for dual-directional data transfer, where the type-0 ring node 11 has a cut path to prevent an infinite loop and the type-1 node 12 has a cross path to reach a destination which is not reachable otherwise by the cut path. As shown in FIG. 3A, a four-node ring network 1 of the present invention has two reversed directional circle paths running through four nodes and cross paths between two corresponding nodes. In this way, peer-to-peer access is done by following certain paths. Since the four-node ring network is able to access data at the four nodes without collision with the reversed directional circle paths and the cross paths, a best local bandwidth and a simple routing is obtained.

As shown in FIG. 3B, a controller 3 is used to control the four-node ring network 1. Because four nodes in the four-node ring network 1 only allow different destinations at the same time, the complexity on arbiter calculating is under 4!, which shows a low arbitration complexity. In addition, transferring data to a destination by ring path so that routing complexity of multi-peer to multi-peer is reduced, resulting in low routing complexity.

Figure 4A:
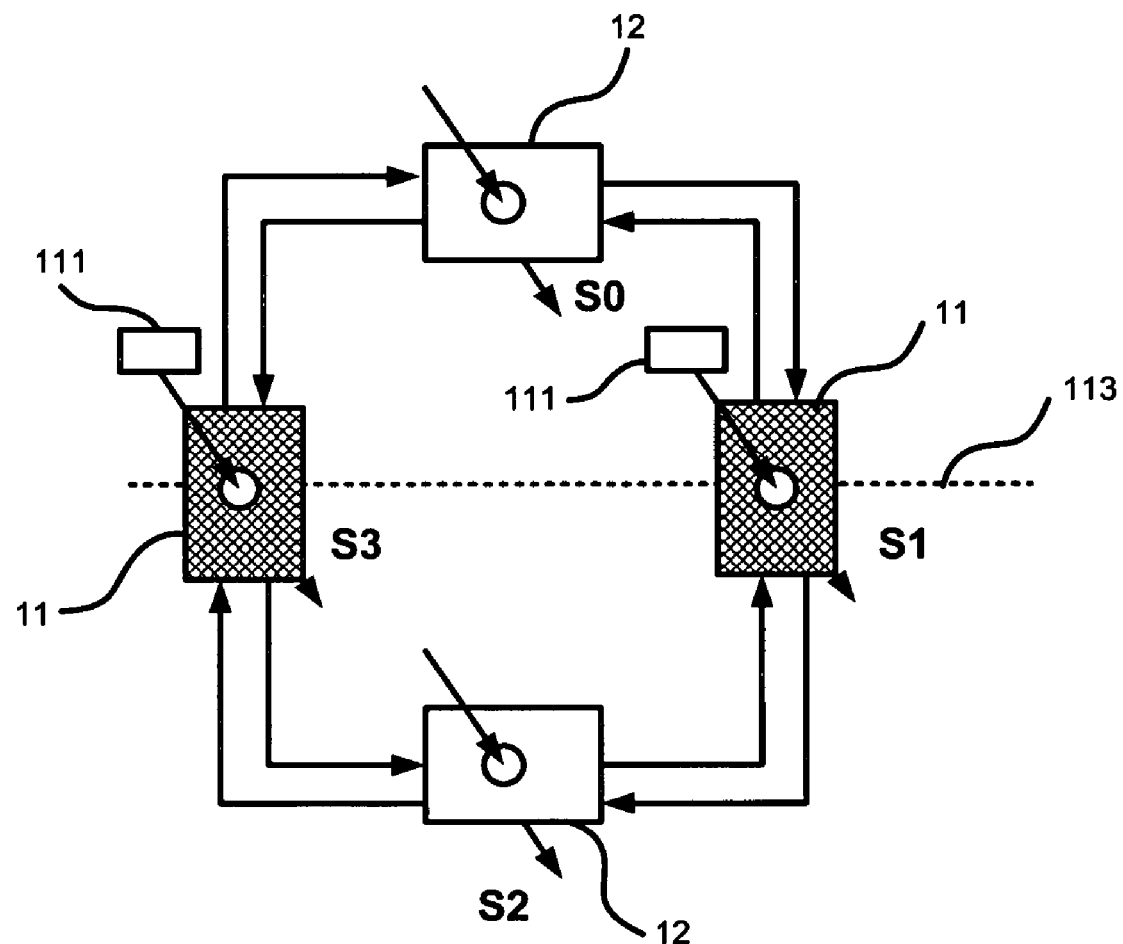
FIG. 4A to FIG. 4E are views showing applications of the type-0 ring node.
Figure 4B:
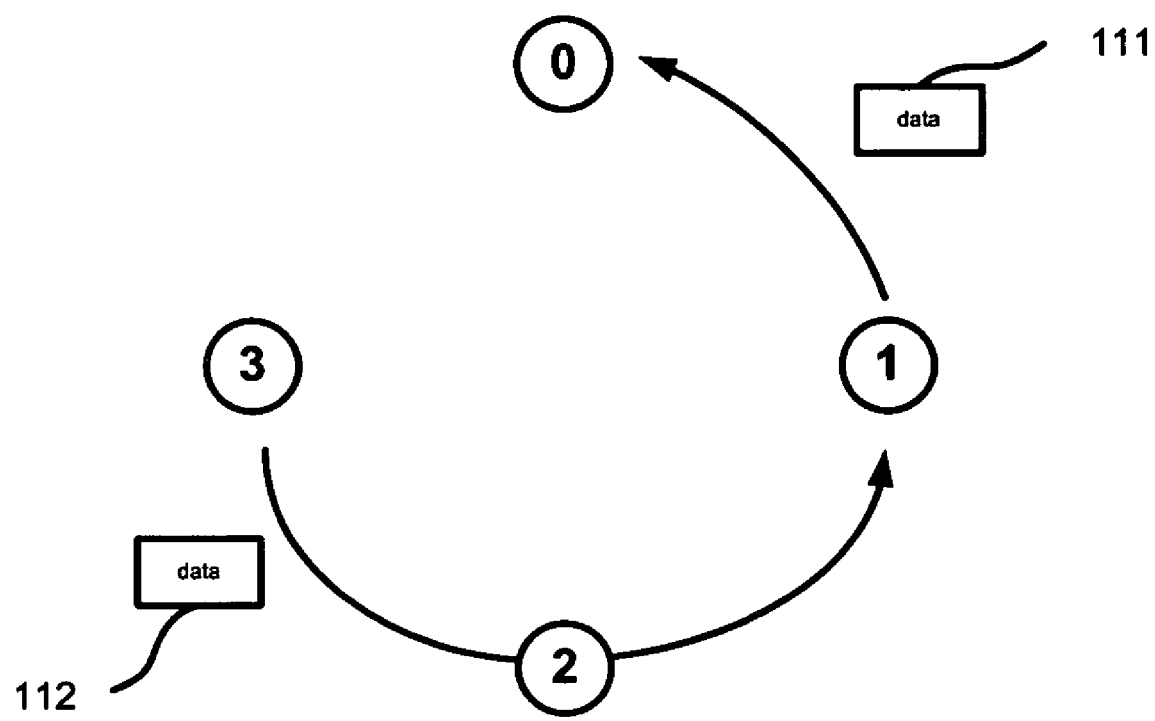
Figure 4C:
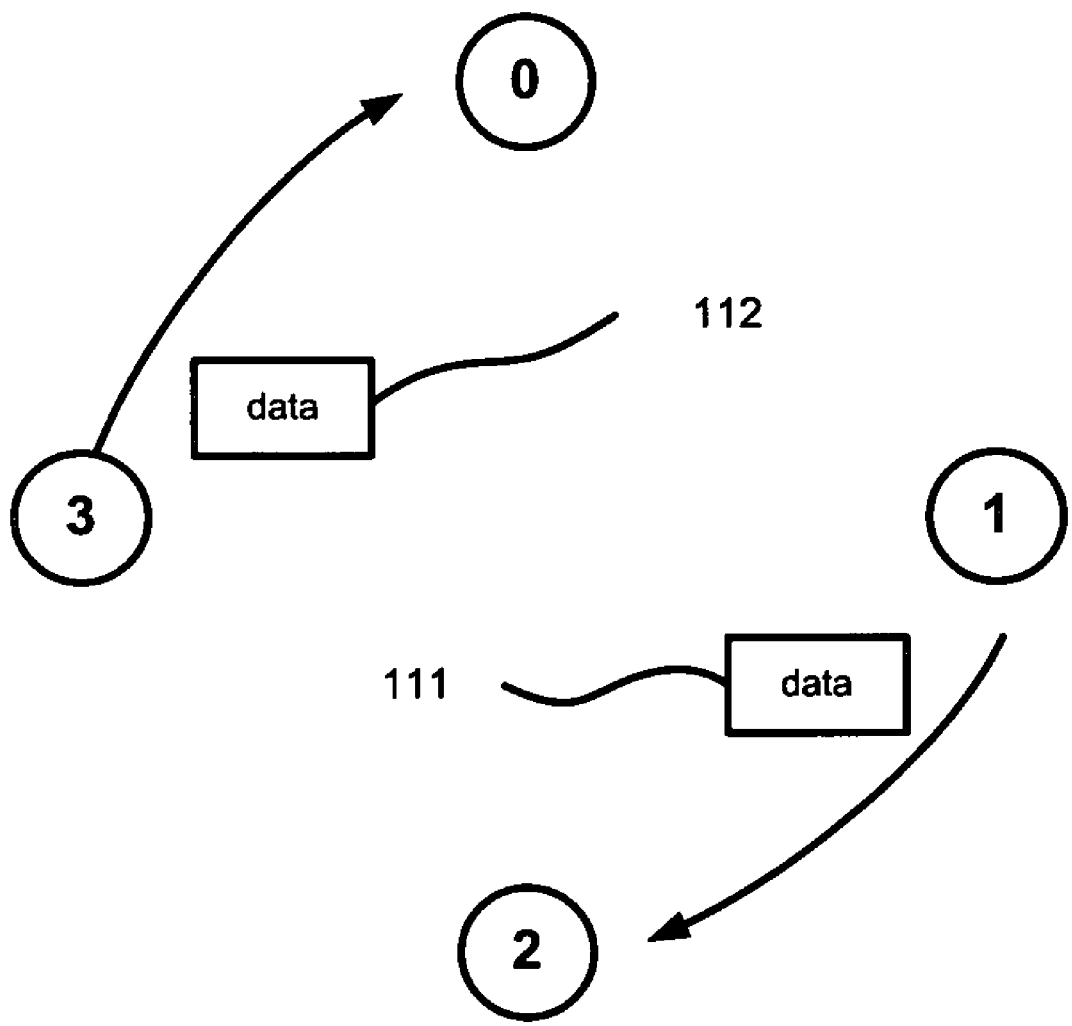
Figure 4D:
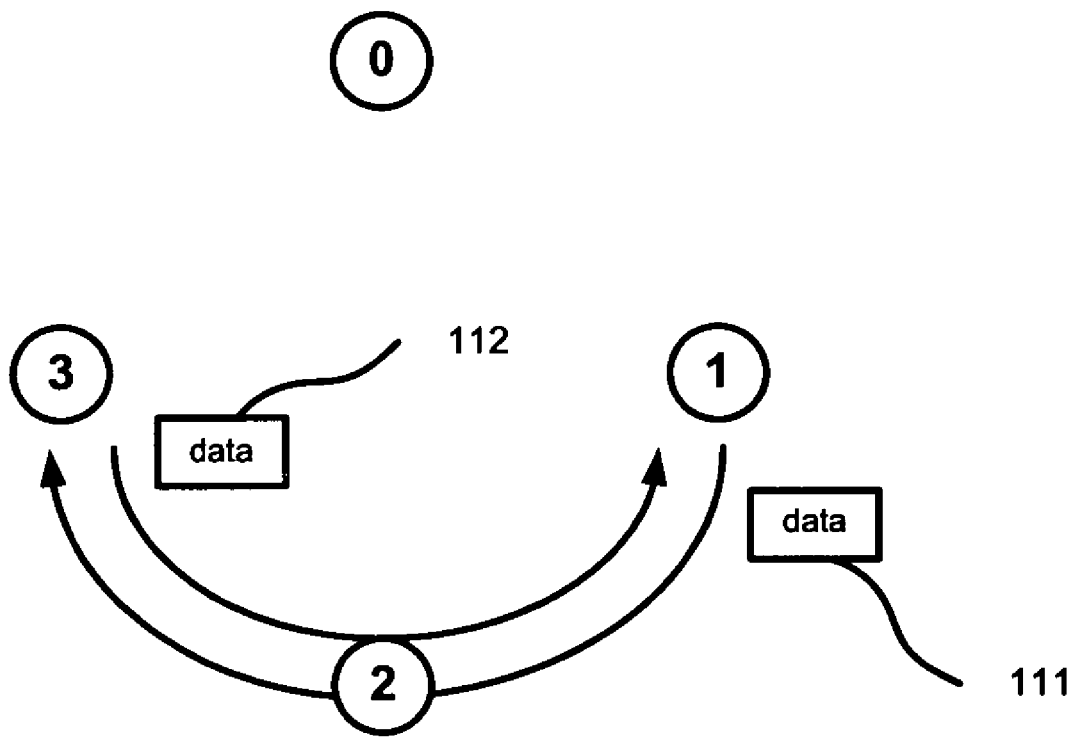
Figure 4E:
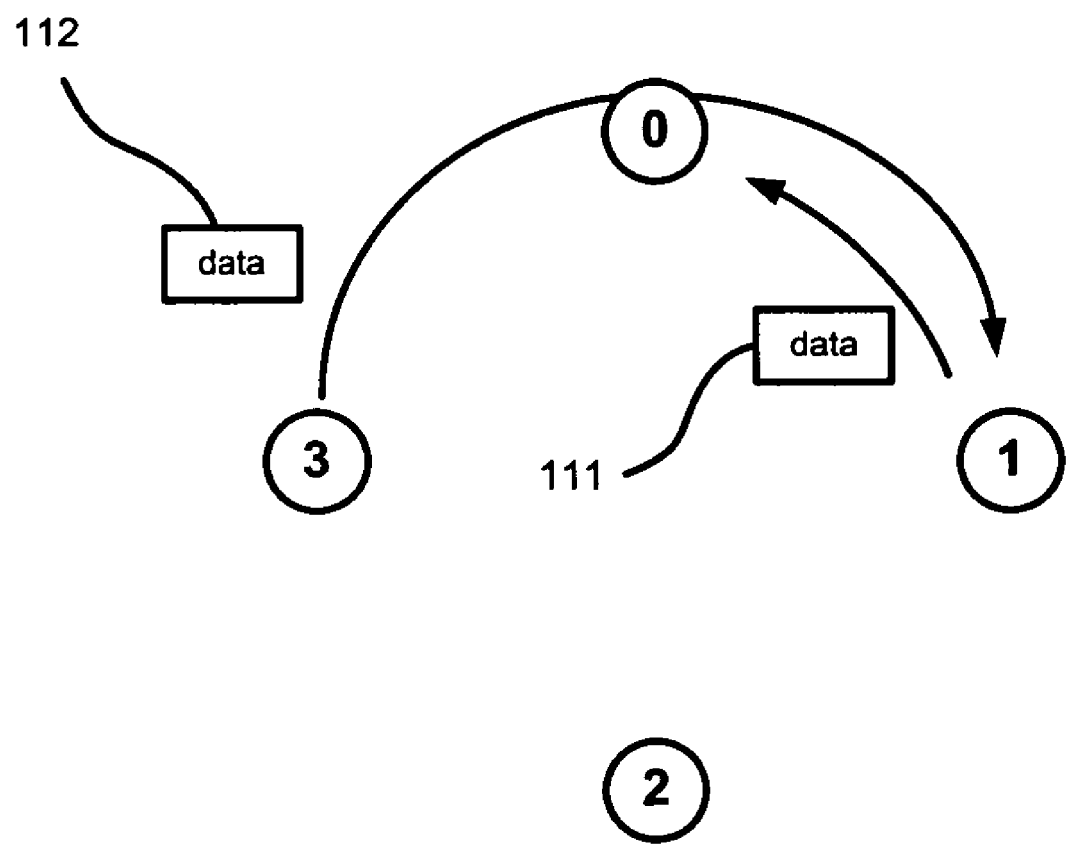

Please refer to FIG. 4A to FIG. 4E and FIG. 5A to FIG. 5E, which are views showing applications of type-0 ring nodes and type-1 ring nodes. As shown in the figures, a type-0 ring node 11 for dual-directional data transfer used in a four-node ring network 1 has a cut path so that switching between data from left to right connection and data from right to left connection is not available. As shown in FIG. 4B, first data 111 is transferred from a second node (node 1) to a first node (node 0). A transferring path from the second node (node 1) to a third node (node 2) and then to a fourth node (node 3) to the first node (node 0) is not possible owing to the cut path of the type-0 nodes 11. As shown in FIG. 4D, second data 112 is transferred from the fourth node to the third node and then to the second node. Therein, the first data and the second data both pass through the same third node by two reversed directional circular paths. Concerning FIG. 4C and FIG. 4E, transferring paths are understood following the same principle as is described above.

Figure 5A:
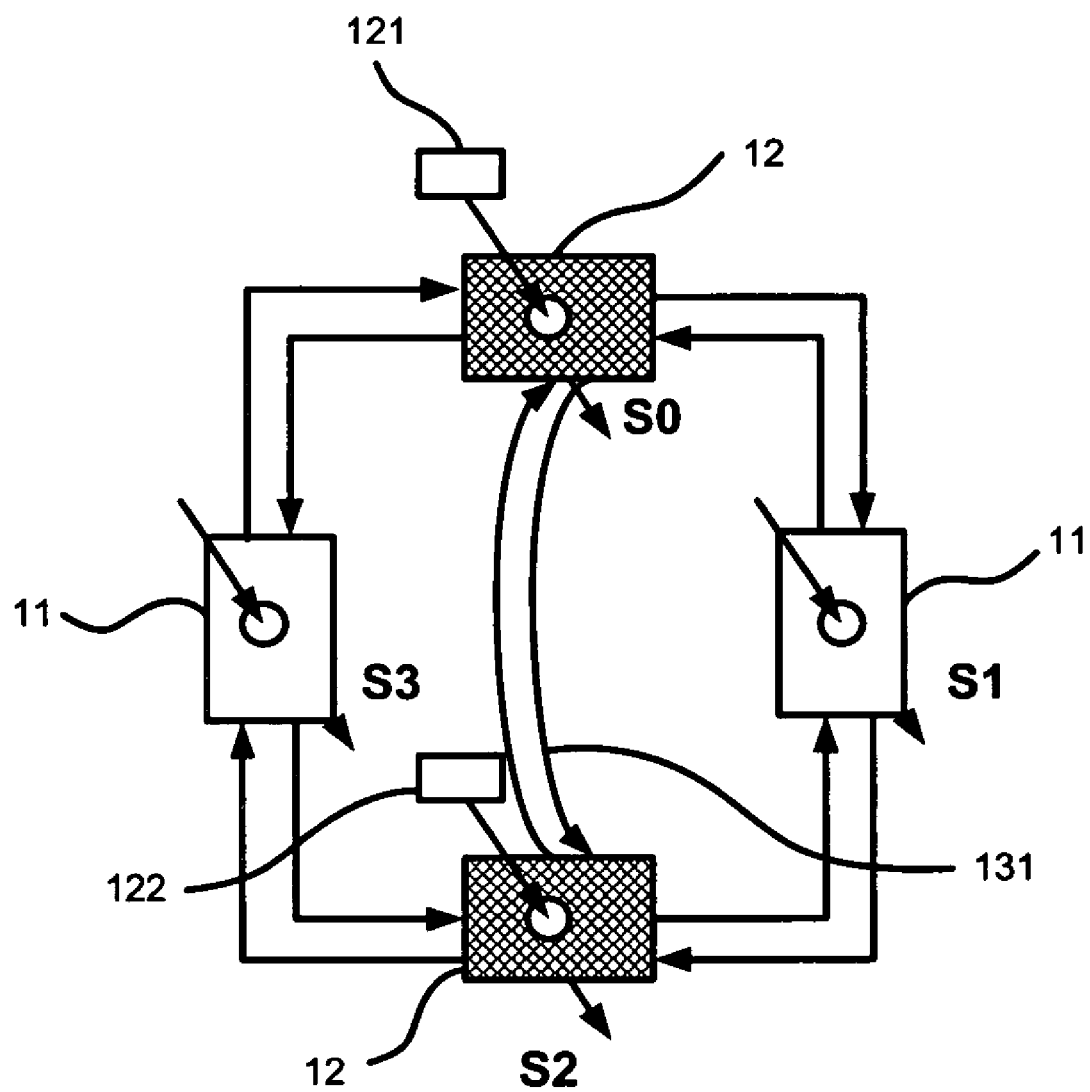
FIG. 5A to FIG. 5E are views showing applications of the type-1 node.
Figure 5B:
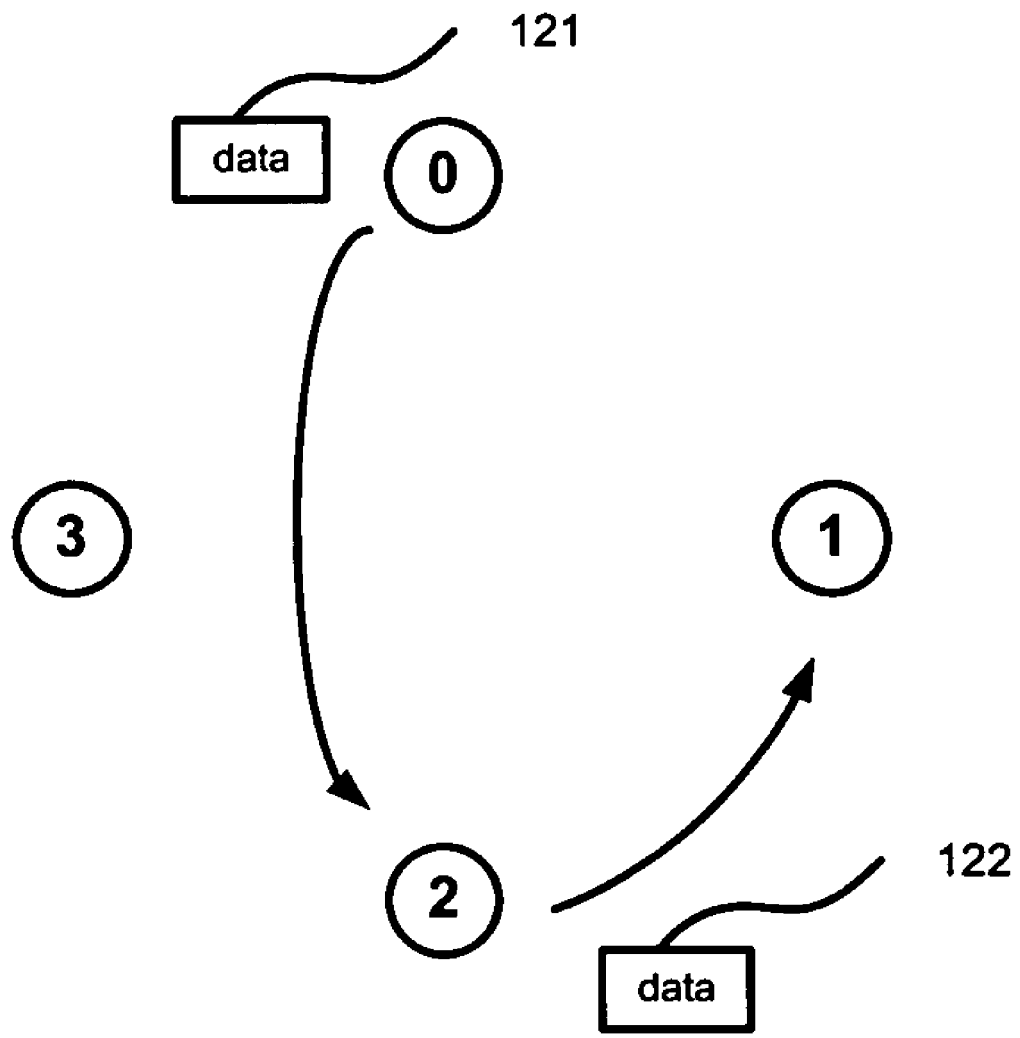
Figure 5C:
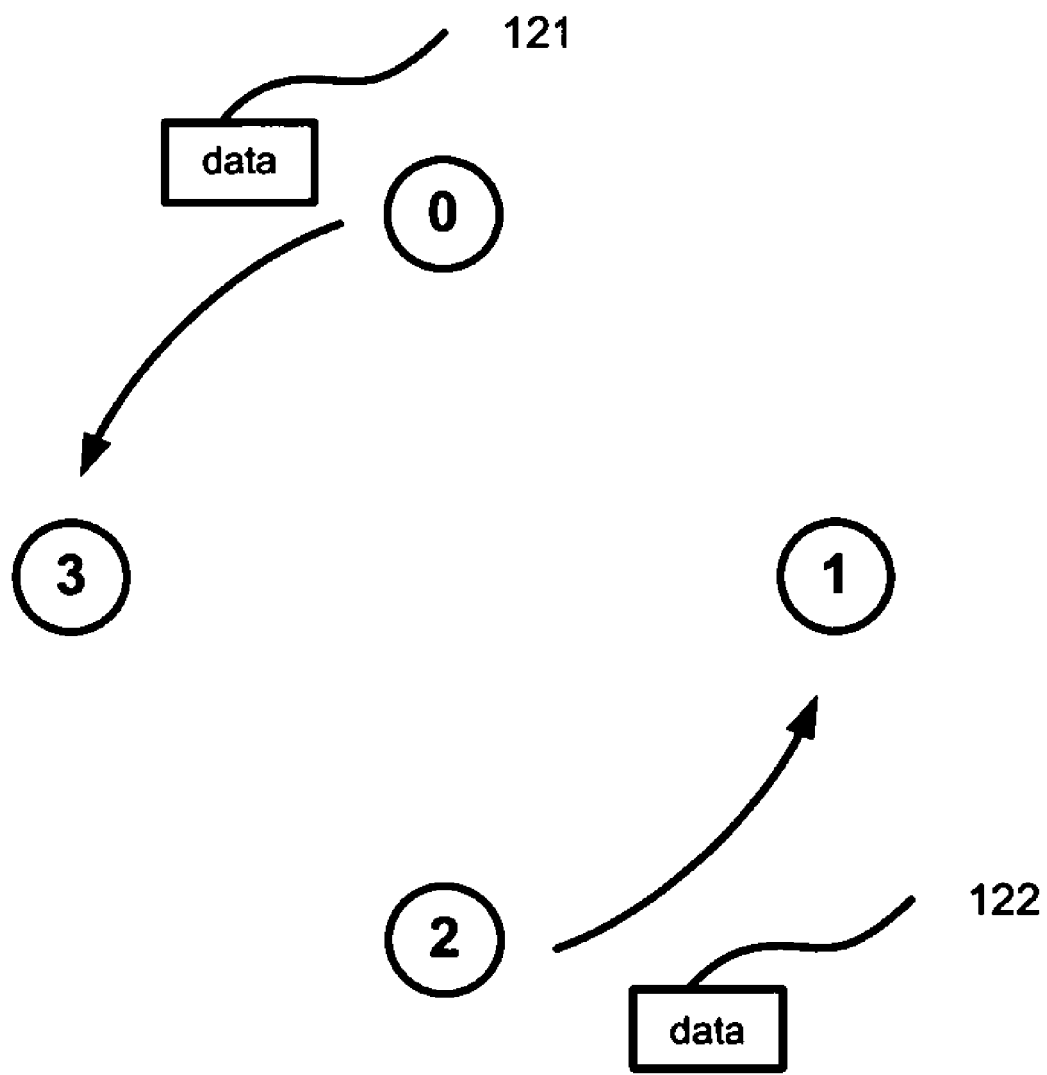
Figure 5D:
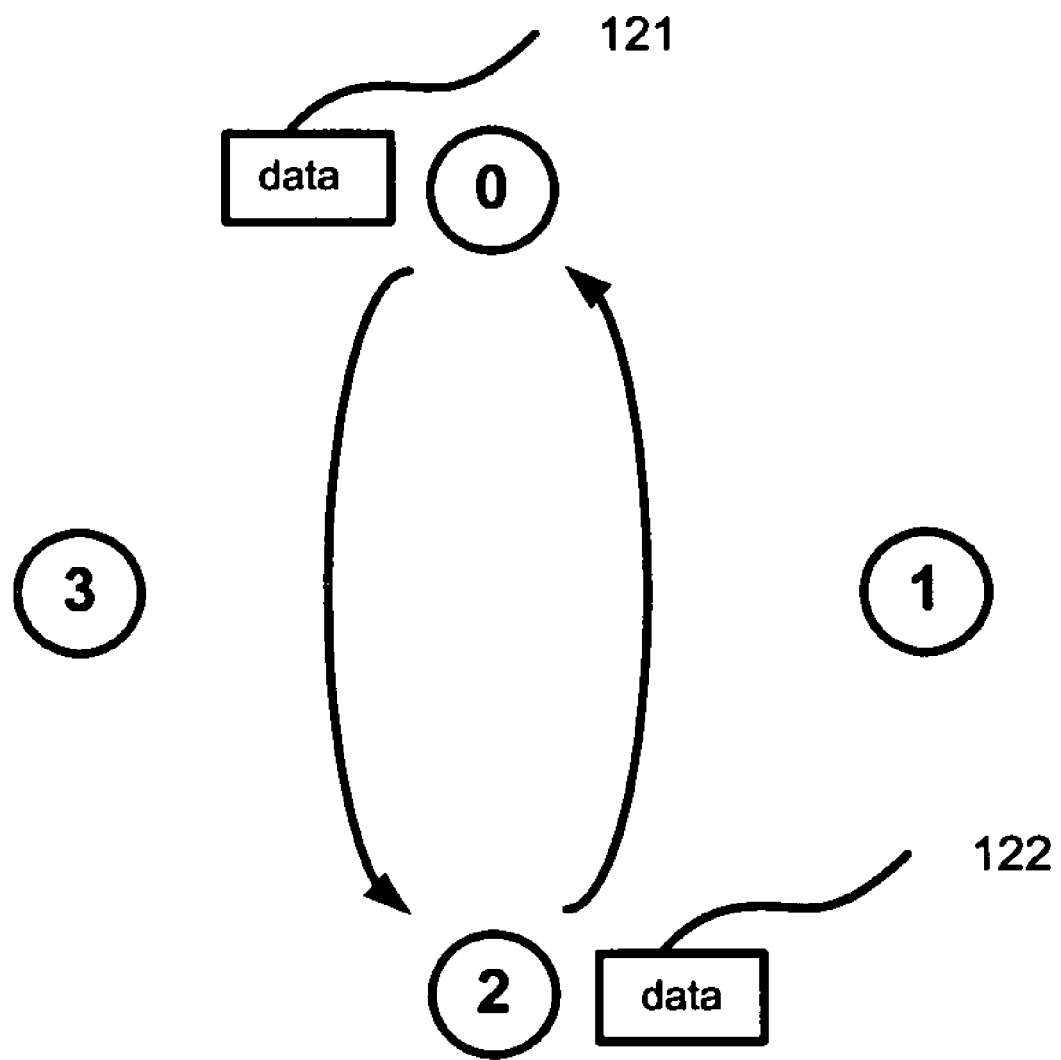
Figure 5E:
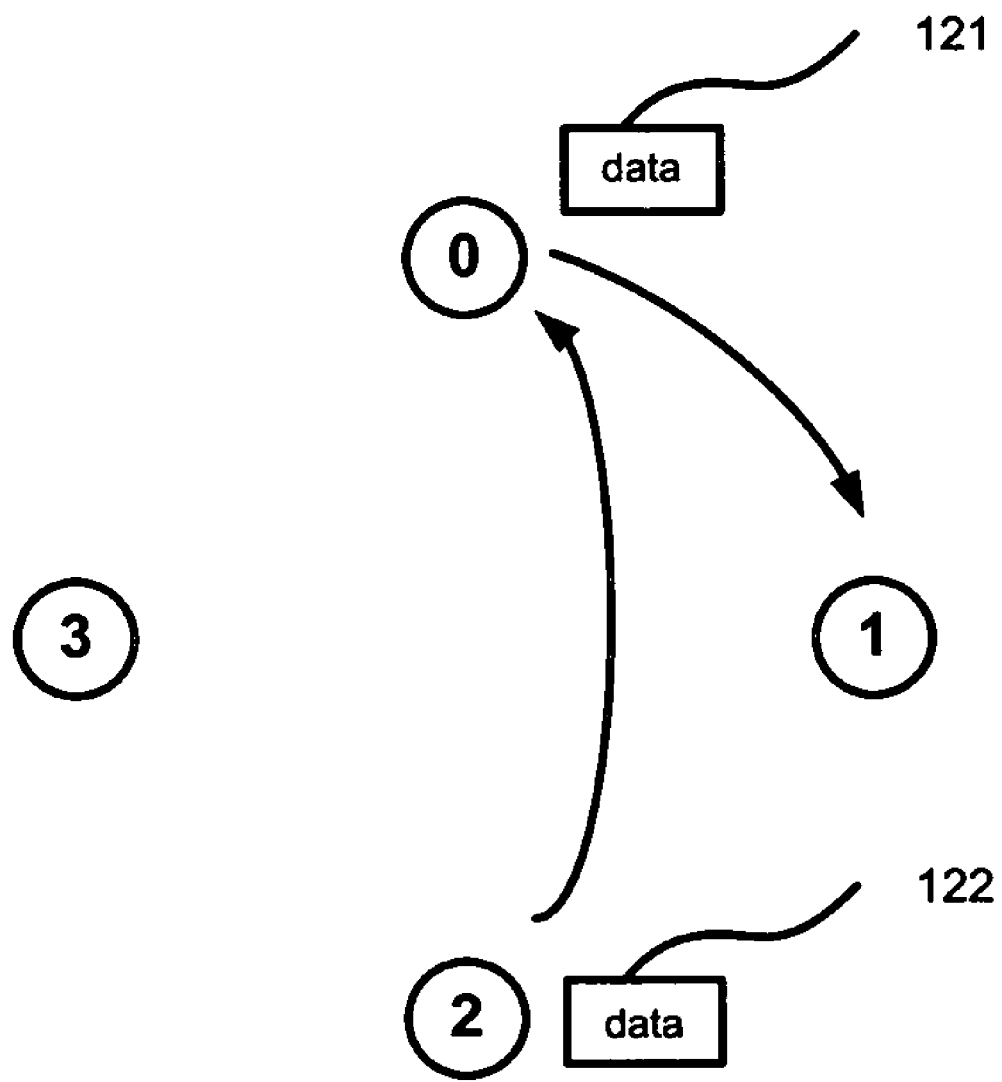
Figure 6A:
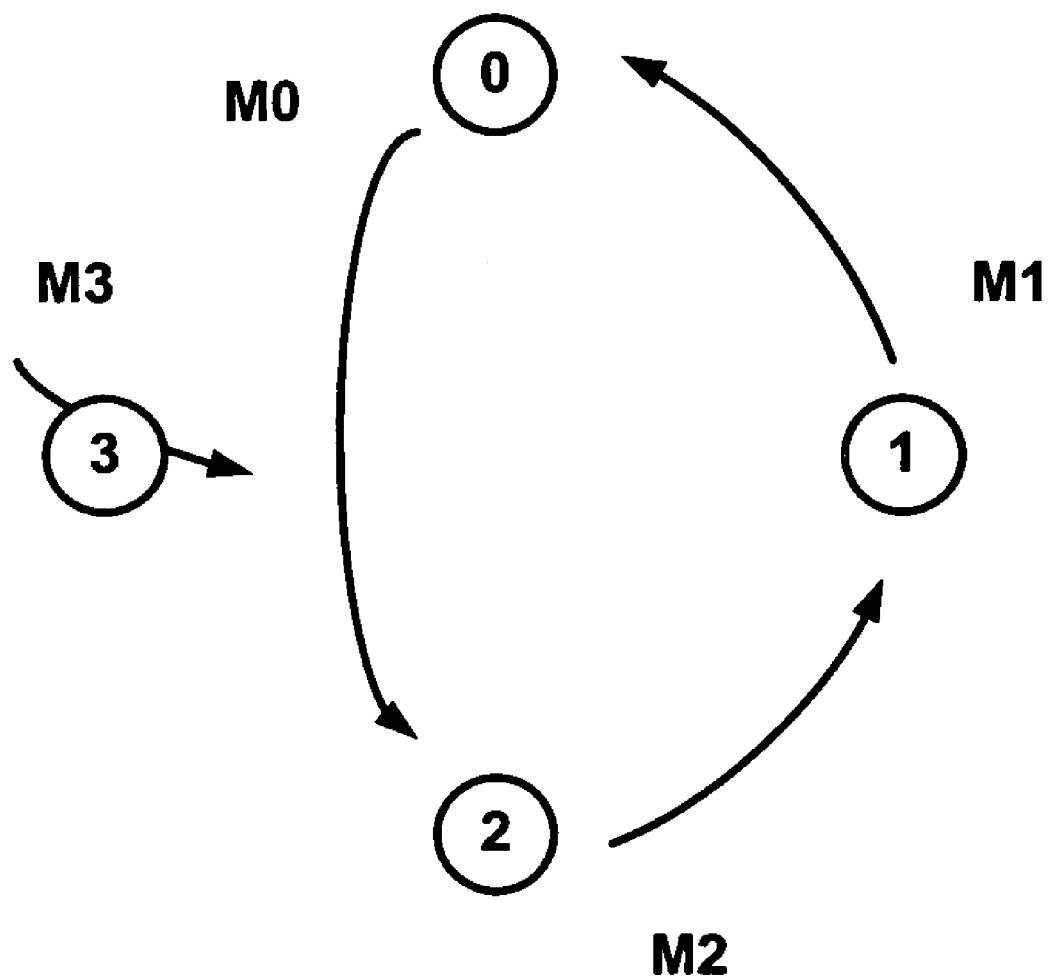
FIG. 6A to FIG. 6F are views showing data transference between the four nodes.
Figure 6B:
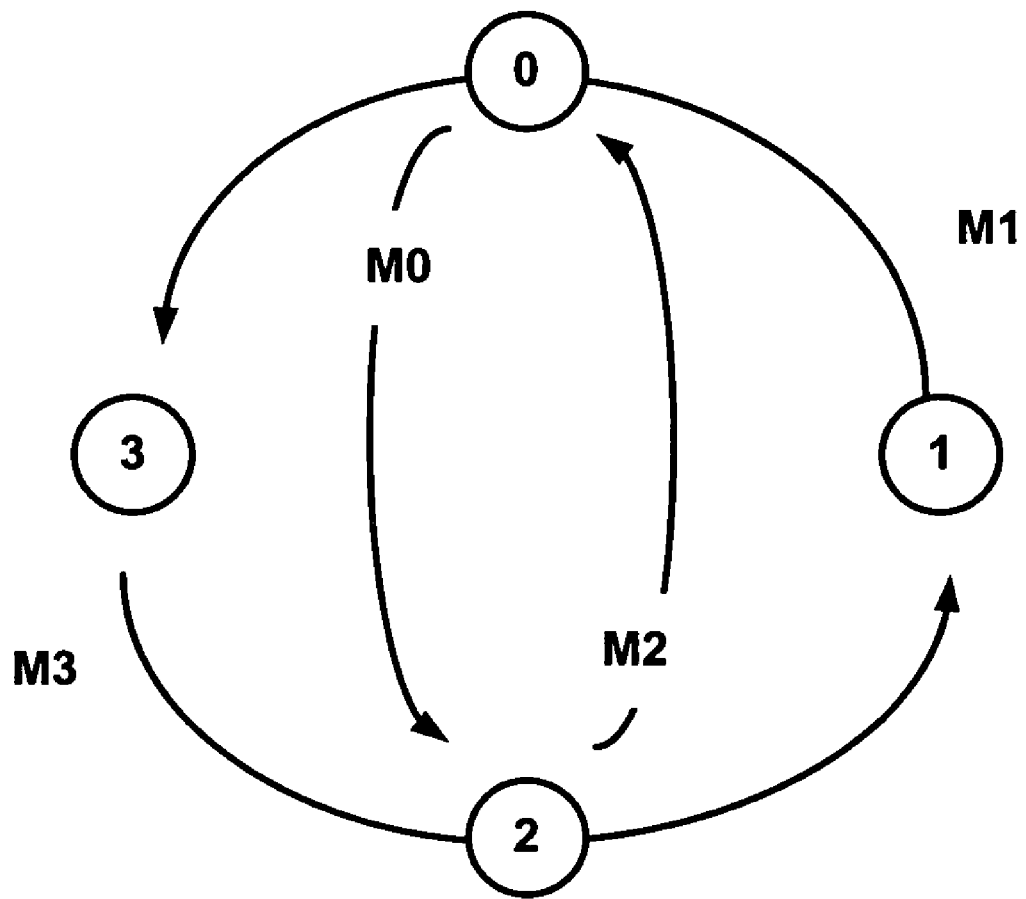
Figure 6C:
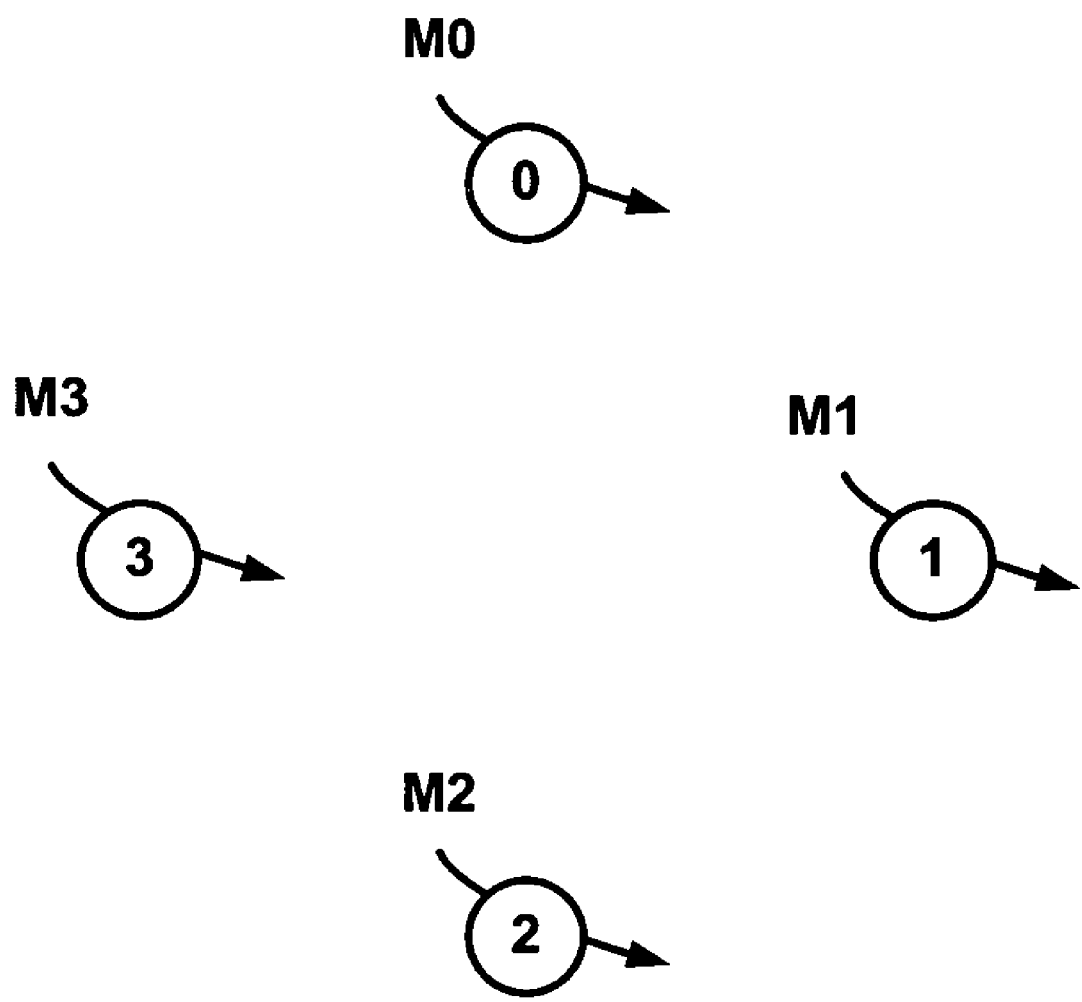
Figure 6D:
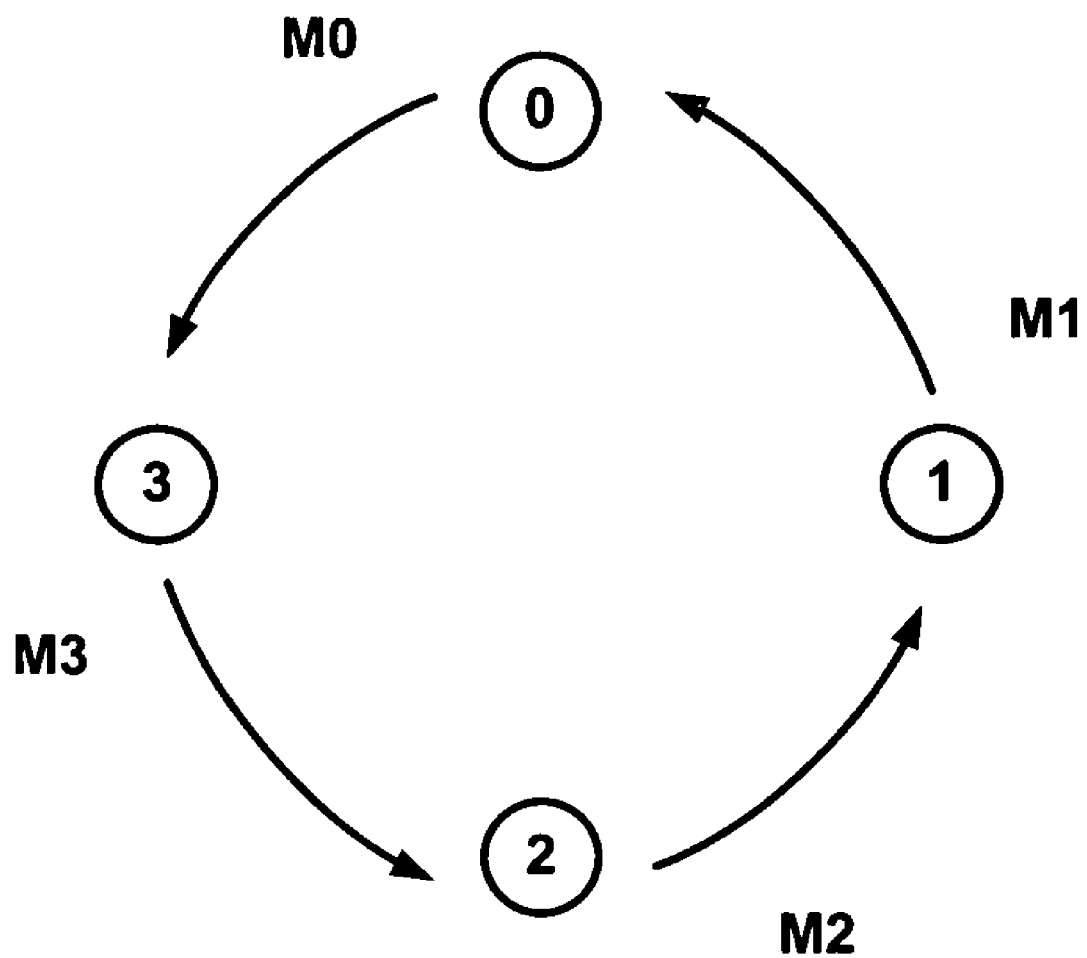
Figure 6E:
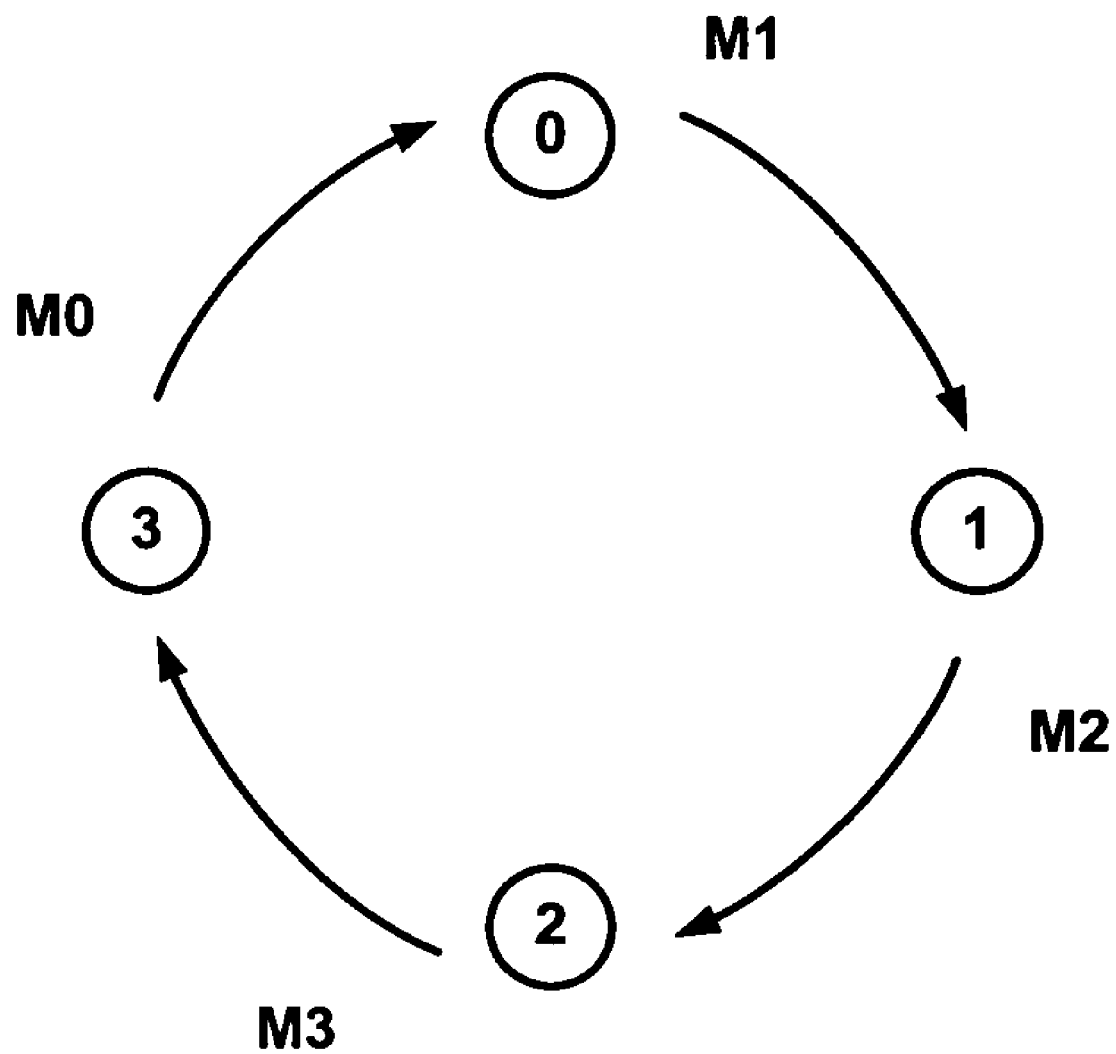
Figure 6F:
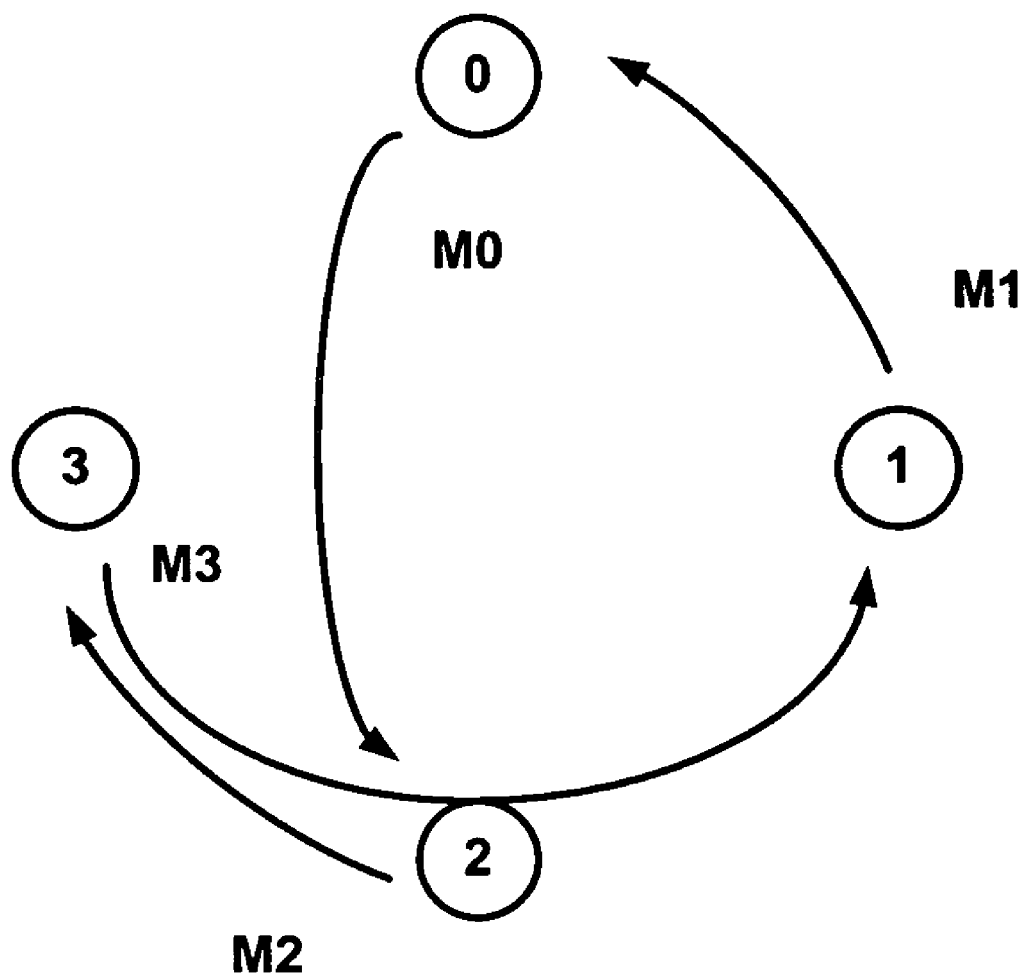

As shown in FIG. 5A to FIG. 5E, a type-1 ring node 12 for dual-directional data transfer used in the four-node ring network 1 has a cross path to obtain paths which are otherwise not available through the cut path. Opposite nodes in the four-node ring network 1 do not transfer data without the cross path because of the cut path of the type-0 ring nodes, e.g. the second node and the fourth node. As shown in FIG. 5B, third data 121 is transferred from the first node to the third node through the cross path. Fourth data 122 is transferred from the third node to the second node. Concerning FIG. 5C and FIG. 5E, transferring paths are understood following the same principle as is described above.

Please refer to FIG. 6A to FIG. 6F, which are views showing data transference between four nodes. As shown in the figures, one of four-factorial conditions are shown, e.g. corresponding paths for simultaneously transferring data to different destinations. Each path passes through at most three nodes between a starting node and an ending node in a four-node ring switch structure, which is an optimized path for the four-node ring switch structure having two reversed directional circle paths.

Figure 7:
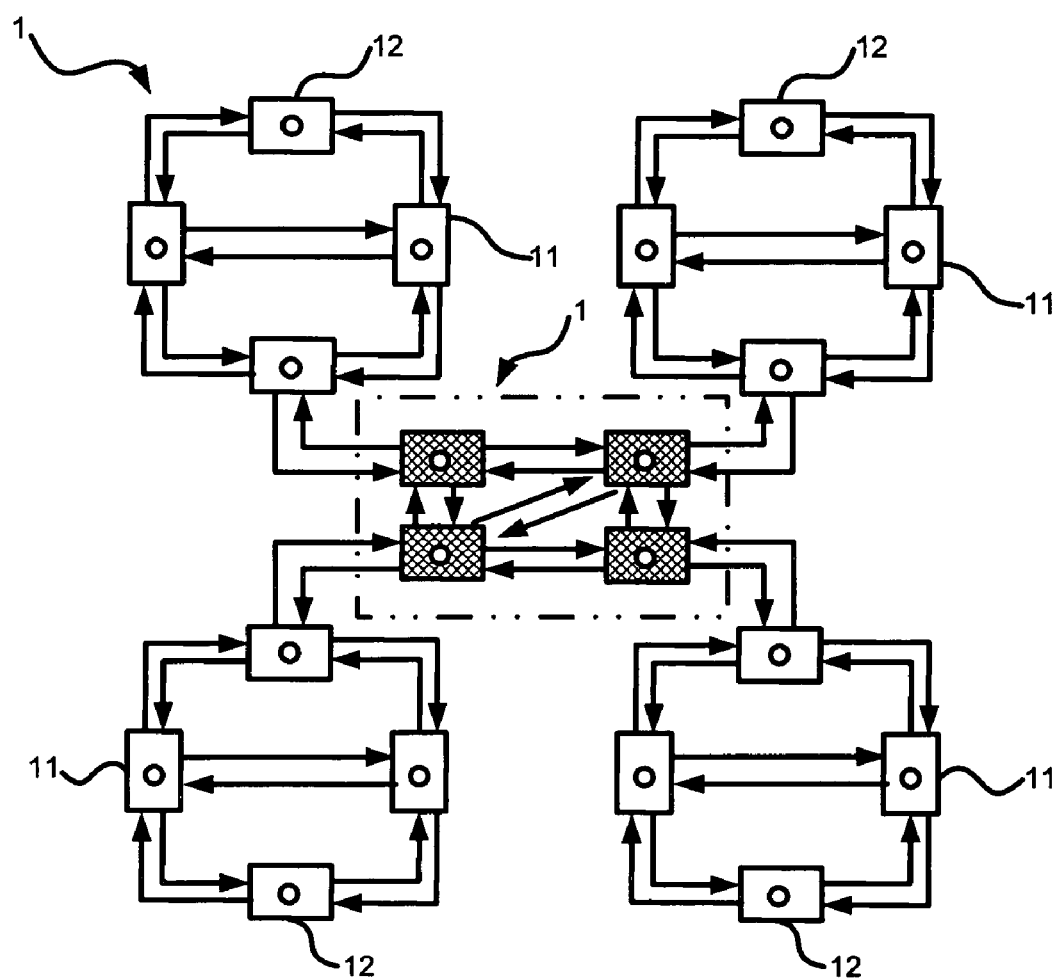
FIG. 7 is a view showing a hierarchical ring architecture having two layers.
Figure 8:
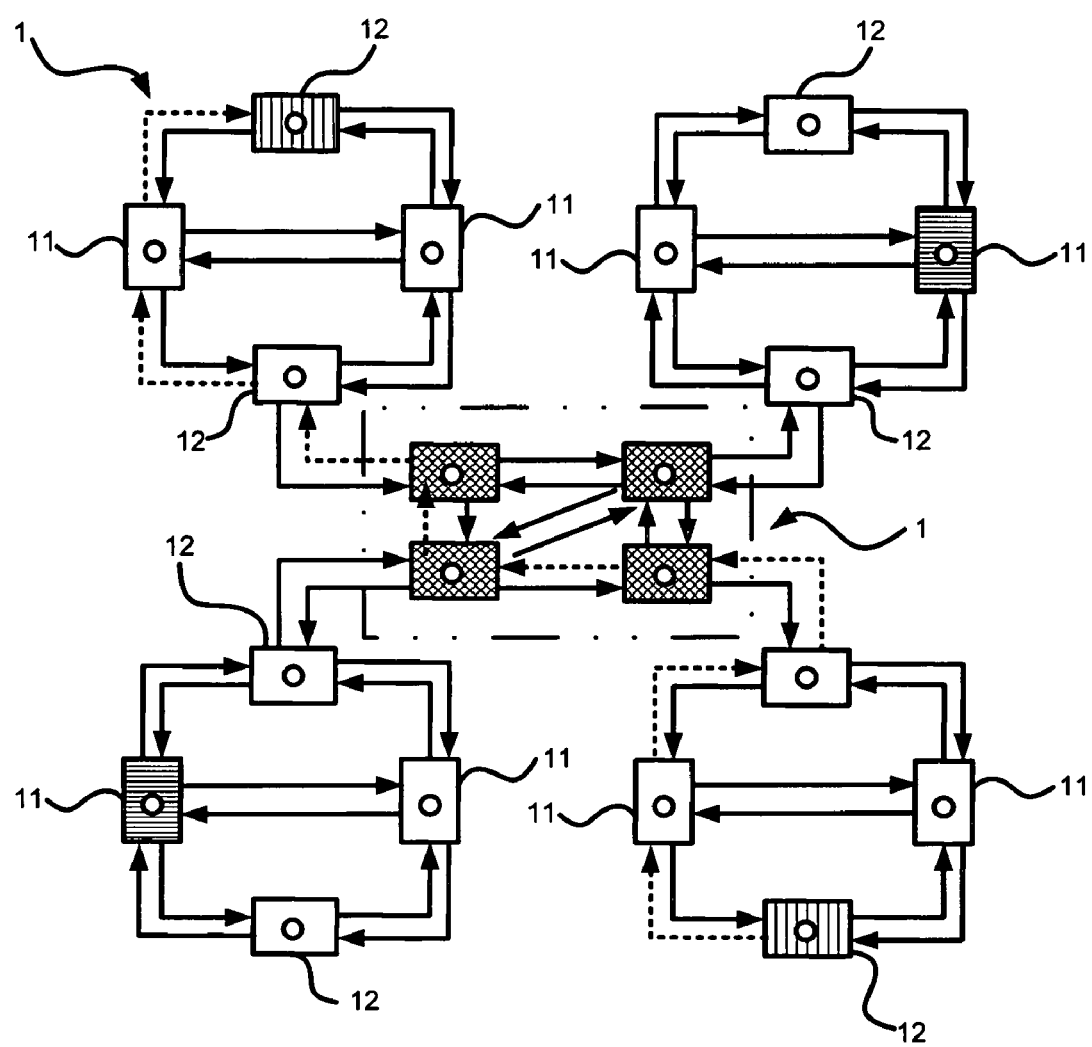
FIG. 8 is a view showing two data transferring paths in a hierarchical ring architecture.
Figure 9:
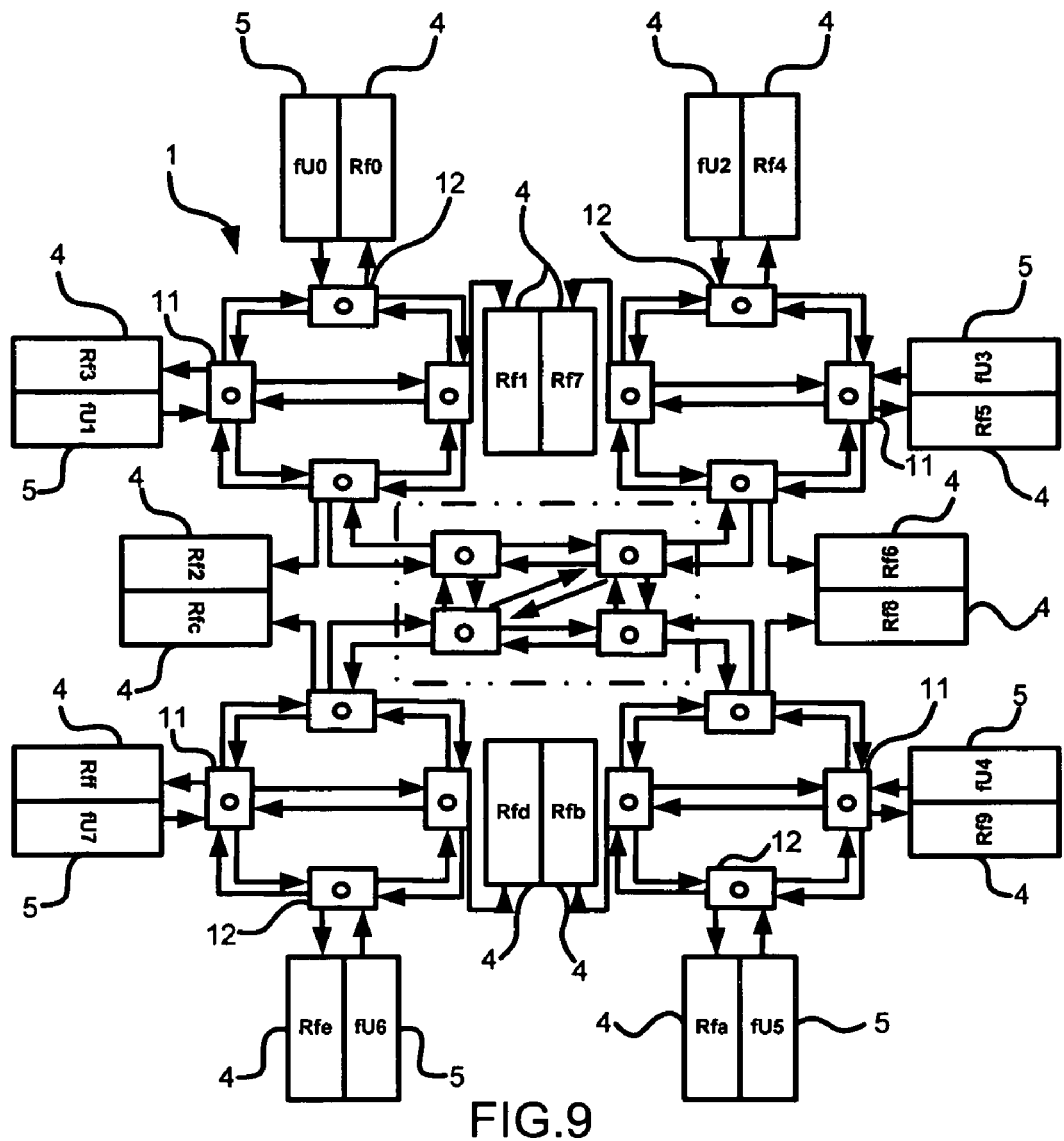
FIG. 9 is a view showing a hierarchical ring architecture combining multiple function units and multiple register banks.

Please refer to FIG. 7 to FIG. 9, which are views showing a hierarchical ring architecture having two layers. This is an example of two data transferring paths cross top-layer in the hierarchical ring architecture and of the hierarchical ring architecture combining with multiple function units and multiple register banks. As shown in the figures, a four-node ring network 1 has four nodes for accessing data. A hierarchical ring architecture is thus provided to extend a circuit of multi-node on-chip network. The hierarchical ring architecture is based on the four-node ring network 1 and comprises four four-node ring networks 1 connected with one four-node ring network 1. The hierarchical ring architecture having two layers of the four-node ring networks provides 16 nodes for component mounting. If more nodes are required, a further layer is added to provide 64 nodes, which best integrates a great number of nodes.

Two paths passing through six and eight nodes separately are shown in FIG. 8, where the hierarchical ring architecture of four four-node ring networks 1 is shown. Hence, a communication interface of the hierarchical ring architecture needs only an additional buffer to achieve a low control complexity and minimize a global control. Thus, in the hierarchical ring architecture of four-node ring networks 1, routing complexity between multiple nodes is reduced by ring paths for reaching targets and by lesser routings at higher layer of the hierarchical ring architecture. Consequently, a low routing complexity is obtained for optimizing practice of an on-chip network.

As shown in FIG. 9, a hierarchical ring architecture of four-node ring networks connects eight function units 5 and sixteen register banks 4 for multi-threading multiple processors, where data is rapidly exchanged between multiple functional units and register banks. Thus, performance is greatly enhanced and monolithic register file costs are reduced.

As a conclusion, the present invention has the following advantages:

1. A four-node ring network according to the present invention provides four nodes to access data simultaneously with only two types of ring nodes and two reversed directional ring paths for obtaining a wide bandwidth, a low cost, and as simplicity.

2. A hierarchical ring architecture of four-node ring networks provides global connections for farer nodes with its higher layer. By doing so, path complexity is reduced and a shorter path for farer nodes is obtained.

3. Each of the four-node ring networks contains a local arbiter to locally control the path selection. Thus, global control is greatly reduced with low control complexity and high circuit flexibility.

4. The hierarchical ring architecture of four-node ring networks has a great localized prosperity for optimizing practice of an on-chip network.

To sum up, the present invention is a circuit of an on-chip network having a four-node ring switch structure, wherein multiple data transfers in parallel with a dynamic configuration are provided between multiple processor cores or between multiple functional units and register banks for obtaining a low control complexity, an optimized local bandwidth, optimized paths for far nodes, and a simplified circuit.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A circuit of an on-chip network having a four-node ring switch structure, comprising:

two type-0 ring nodes providing dual-directional data transfer, each said type-0 ring node comprising three data input ports, three data output ports and five data transferring lines, each said type-0 ring node transferring and switching data, wherein two pairs of said data input ports and said data output ports are configured as left side and right side connection data transfers, and wherein the other pair of said data input ports and said data output ports are configured as input interface and output interface data transfers; and two type-1 ring nodes providing dual-directional data transfer, each said type-1 ring node comprising four data input ports, four data output ports and nine data transferring lines, each said type-1 ring node transferring and switching data, wherein two pairs of said data input ports and said data output ports transferring data are configured as left side and right side connection data transfers, and wherein another pair of said data input ports and said data output ports are configured as cross connection data transfers in said ring switch structure, and wherein the other pair of said data input ports and said data output ports are configured as input interface and output interface data transfers.

2. The circuit according to claim 1, wherein at least one said type-0 ring node has a cut path.

3. The circuit according to claim 1, wherein at least one said type-1 ring node has a cross path.

4. The circuit according to claim 1, wherein said circuit further has a hierarchical ring architecture.

* * * * *